March 21, 1933.   C. W. VOGT   1,902,346
ROTARY PUMP
Filed Aug. 23, 1930
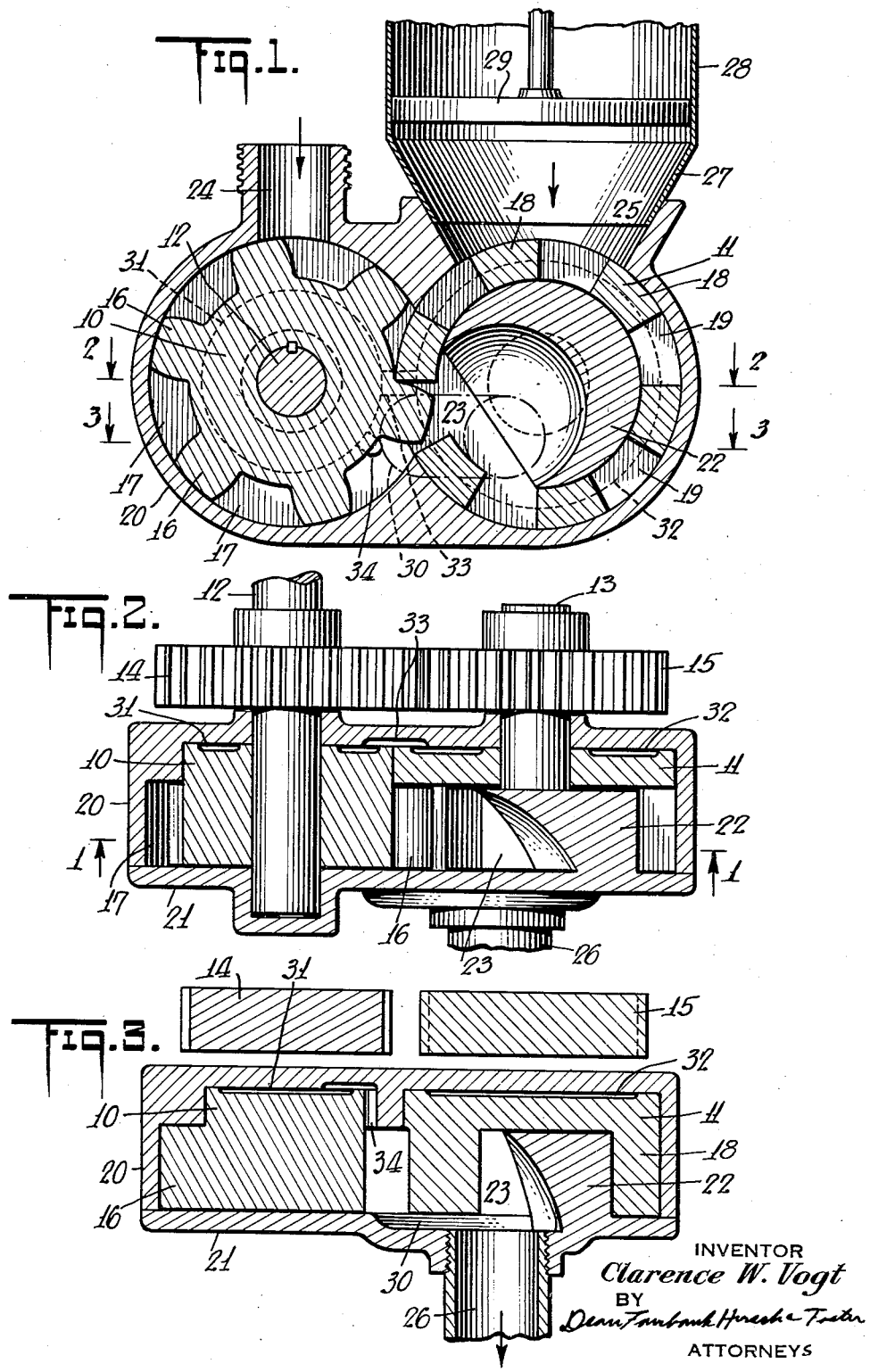
INVENTOR
Clarence W. Vogt
BY
ATTORNEYS Patented Mar. 21, 1933

1,902,346

UNITED STATES PATENT OFFICE

CLARENCE W. VOGT, OF LOUISVILLE, KENTUCKY, ASSIGNOR TO VOGT INSTANT FREEZERS, INCORPORATED, OF LOUISVILLE, KENTUCKY, A CORPORATION OF DELAWARE

ROTARY PUMP

Application filed August 23, 1930. Serial No. 477,232.

In certain industries it is desirable to pump material which includes comparatively large solid particles or lumps, and this material interferes with the action of the pumping elements. For instance, in the manufacture of ice cream in a continuous freezer, it is often desirable to deliver with the mix entering the freezer or into the ice cream after it leaves the freezer, pieces of fruits, nuts or other edible substances of solid form.

In certain industries, it is desirable to proportion and mix a plurality of separate fruits and to deliver the blend or mixture continuously by some form of pumping mechanism. For instance, in the manufacture of ice cream, margerine, lard or other comestible, it is desirable to force proper relative proportions of the mix or other liquid and air or other gas into a continuous freezer or chilling apparatus. In some instances, it is desirable to continuously deliver the partially frozen mix or other liquid, and blend with it a proper proportion of air, inert gas or other fluid.

One of the main objects of my invention is to provide a rotary pump capable of effectively pumping solid particles or small bodies with or without other medium and without liability of crushing the solids or interfering with the proper operation of the pump.

A further object of the invention is to provide an improved form of rotary pump in which separate fluids may be admitted through separate inlets in the proper proportions blended or mixed within the pump or at the outlet thereof, and delivered together.

A further object of my invention is to provide a pump capable of effectively delivering separate portions of ice cream and edible solids and to blend and deliver the two portions so that the delivered product will have the edible solids in the proper proportion to the entire mass.

In my prior application, Serial No. 452,624, filed May 15, 1930, I have disclosed a type of rotary pump capable of accomplishing certain of the objects above referred to. My present invention is an improvement on that disclosed in said application, and is better adapted for the handling of materials carrying solid particles, lumps or other bodies, such as fruit or nuts.

In the accompanying drawing, I have illustrated merely one embodiment of my invention, but it will be understood that various changes may be made in the construction and operation of the mechanism illustrated without departing from the spirit of my invention or the scope of the appended claims.

In this drawing,

Fig. 1 is a transverse section on the line 1—1 of Fig. 2, and

Figs. 2 and 3 are transverse sections on the lines 2—2 and 3—3, respectively, of Fig. 1.

In the specific description of this apparatus, I will refer to its use in connection with ice cream and solid edible bodies to be mixed therewith, but it will, of course, be obvious that the pump may be used for various other materials, and is of special utility where the same kind of problems are presented as in connection with such ice cream and solids.

As one important feature of my improved rotary pump, there are provided a pair of gear members, at least one of which has laterally projecting or over-hanging teeth, whereby the material may be delivered into the interdental spaces from the periphery, and pushed on through in the same direction to the interior of the gear and to the outlet of the pump by the action of the teeth of the other gear.

In the specific form illustrated, there are provided a pair of intermeshing gear members 10 and 11 in a suitable casing, and mounted upon parallel shafts 12 and 13. These shafts are connected by outside gears 14 and 15 whereby the two gear members 10 and 11 are rotated in intermeshing relationship and in opposite directions without either serving directly as the driver of the other. In the form illustrated, the gear member 10 has a plurality of radially projecting teeth 16 and interdental spaces 17. The other gear member 11 shown is of the same pitch diameter as the gear 10, but its teeth 18 project axially as an annular series and are separated by interdental spaces 19. The teeth of each gear member and the interdental spaces are proportioned in respect to the interdental spaces and teeth of the other gear member, so that proper intermeshing occurs, and the interdental spaces of one gear member are proportioned in respect to those of the other to properly proportion the two fluids or other materials to be advanced.

The two gear members are mounted in a suitable casing 20 provided with a removable head or end wall 21 which carries a core 22 extending into the interior of the gear member 11, so as to be encircled by the teeth of the latter. This core 22 serves as a sealing member along a considerable portion of its periphery, and particularly opposite the pump inlet to this gear member. It also provides a chamber 23 disposed opposite to, or in registry with the point of intermeshing of the two gear members.

The casing is provided with an inlet 24 to the interdental spaces of the gear member 10, and a second inlet 25 to the periphery of the interdental spaces in the gear member 11. These two inlets are spaced from each other, and at the proper distance from the point of intermeshing of the gear members so that none of the material from an inlet can be forced out through the other inlet. The casing is provided with an outlet 26 which communicates with the chamber 23, and also with the interdental spaces of the gear member 10 at the point where the gear members come together.

The inlet 25 to the gear member 11 is shown as a hopper which may be filled with the material containing the solid particles or bodies, and suitable means may be provided for delivering this material to the interdental spaces of the gear member 11 under pressure to insure proper feeding. Merely as an example of such feeding means, I have shown the hopper 27 forming the bottom of a chamber 28 containing a piston or plunger 29. Instead of a piston or in connection therewith, I may insure proper feeding by a suitable agitator which will prevent bridging of the solids across the inlet opening.

In the operation of the pump, the nuts, fruits or other edible solids are placed in the receiver 28, and are forced into the interdental spaces 19 of the rotor 11. Ice cream is continuously delivered through the inlet 24. The two gear members rotate in opposite directions as indicated by the arrows, and thus the gear member 11 carries successive charges of the solids around toward the point of intermeshing of the gears. The gear member 10 carries successive portions of the ice cream around to the same point. During a portion of the travel of the interdental spaces 19, they are sealed at the outer end by the casing and at the inner end by the core or sealing member 22. They reach the chamber 23 before they come into mesh with the other gear member. As the two gear members come into mesh, the teeth 16 enter the spaces 19 from the outer side and push the solids out of these spaces into the chamber 23. Thus, the solids enter the spaces from the outer end and leave from the inner end of the spaces and are pushed into the spaces by the action of the plunger 29 and pushed out of the spaces by the teeth 16. These two displacement means thus force the solids in the same direction, that is, inward radially in respect to the spaces 19 along which they are being advanced. At the same time, that the solids are being forced out of the spaces 19 by the teeth 16, the teeth 18 are entering the spaces 17 and forcing out the ice cream from the latter. The ice cream delivered from the spaces 17 and the solids delivered from the spaces 19 are blended as they pass out through the outlet 26.

As the separate interdental spaces of the two gear members have a predetermined proportioning or relationship, it is apparent that the blended mixture will have predetermined proportions of the two materials. The outlet 26 may be in any desired position so as to receive material from both of the two sets of interdental spaces. As shown particularly in Fig. 3, this outlet communicates directly with the chamber 23 into which the solids are forced and communicates by a by-pass 30 with the ice cream advancing spaces. As the outlet is in the end wall, and primarily opposite the chamber 23, and as the blended mixture may be forced out under some pressure, any suitable means may be provided for relieving end thrust on the gear member 11. As illustrated, the casing or the gears at the rear surfaces of the latter have annular grooves or recesses 31 and 32. These may be connected by a groove 33 and the groove 31 may communicate by a passage 34 with one of the spaces 17 where the cream is under pressure, so as to equalize the pressure upon opposite sides of the gear member.

If it is desired to vary the proportions of the ice cream and solids, it will be obvious that the teeth 18 may be made very much wider or narrower in respect to the spaces 19, and the relative proportions of the teeth 16 and spaces 17 correspondingly varied. Although the solid material may be comparatively dry when forced into the spaces 19 from their outer or larger ends, it will be noted that as the two gear members come into mesh, a portion of the ice cream will be forced from the spaces 17 through the spaces 19 directly to the chamber 23, and will thus serve to lubricate the parts and facilitate forcing of the solid bodies from the spaces 19 into the inner chamber. Some ice cream may be previously mixed with the solids before the latter are placed in the hopper and the pump will blend this mixture with a further quantity of ice cream.

Although the pump has its primary utility where solid bodies are to be pumped and blended with ice cream, yet it will be evident that the device may be used, if desired, for the blending of two fluids of any character, for instance, air under pressure may be delivered through the inlet 24 and ice cream through the inlet 25, and the two intermixed in the chamber 23, and the aerated mixture delivered through the outlet 26.

As the materials being pumped, or at least one of them is very cold, and as the pumping action tends to generate heat and as the solids if not chilled will tend to melt or soften ice cream, I may and preferably do provide the casing with a jacket through which a refrigerating medium may be circulated to keep the temperature down or even to further freeze the materials.

Having thus described my invention, what I claim as new and desire to secure by Letters Patent is:

1. A rotary pump for mixing, proportioning and advancing separate materials including a pair of intermeshing rotary members having parallel axes, one of said members having an annular series of pockets and an internal chamber and the other having projections adapted to enter said pockets, separate inlets at the peripheries of the two members and an outlet from said chamber, said outlet being disposed adjacent the point of entry of the projections into said pockets.

2. A rotary pump including a pair of intermeshing gear members having parallel axes, one of said members having radially projecting teeth and the other having axially projecting teeth, a core member encircled by the teeth of the second mentioned gear member, separate inlets to the interdental spaces of the two gear members and an outlet adjacent to the point of intermeshing of the gears.

3. A rotary pump, including a pair of intermeshing gear members having parallel axes, one of said members having radially projecting teeth and the other having axially projecting teeth, a core member encircled by the teeth of the second mentioned gear member, separate inlets to the interdental spaces of the two gear members, said core having a chamber into which the material between the axially extending teeth may be forced by the radially extending teeth.

4. A rotary pump including a pair of intermeshing gear members having parallel axes, one of said members having radially extending teeth, and the other having axially extending teeth, a core member encircled by the axially extending teeth and providing a chamber, an inlet to the spaces between the axially extending teeth opposite the outer side of said core, and a chamber in said core opposite the point of intermeshing of said teeth, whereby material carried from said inlet by the spaces between the axially extending teeth may be forced into said chamber by the action of the radially extending teeth.

5. A rotary pump including a pair of intermeshing gear members having parallel axes, each of said members having a portion at one end thereof presenting a cylindrical peripheral surface, said surfaces having line contact, one of said gear members having teeth extending radially and projecting outwardly beyond its cylindrical surface and the other having teeth extending axially and within the circumference of its cylindrical surface, a stationary core member encircled by said axially extending teeth and provided with a chamber registering with the point of intermeshing of the teeth of said gear members, separate inlets to the interdental spaces of said gear members, and an outlet from said chamber, whereby material carried from said inlets by the interdental spaces of both gears is forced in a substantially horizontal direction into said chamber.

6. A rotary pump including a pair of intermeshing gear members having parallel axes, one of said gear members having teeth spaced to form pockets sealed at the radially inner ends, and the other having teeth spaced to form pockets open at both their radially outer and inner ends, separate inlets to the peripheries of said gear members, and a core member within said second mentioned gear member and serving to prevent radially inward flow through the pockets thereof when the latter are in registry with the corresponding inlet, said core member forming a chamber communicating with the inner ends of said last mentioned pockets adjacent to the point of intermeshing of said gears.

7. A rotary pump including a pair of intermeshing gear members having parallel axes, one of said gear members having teeth spaced to form pockets sealed at the radially inner ends, and the other having teeth spaced to form pockets open at the radially outer and inner ends, a casing having separate inlets communicating with the radially outer ends of the pockets of said separate gear members, and stationary means within said second mentioned gear member for preventing inward radial flow through the pockets thereof from the corresponding inlet, but permitting radially inward flow from said last mentioned pockets where the teeth of the other gear member enter said pockets.

Signed at New York in the county of New York and State of New York this 21st day of August, A. D. 1930.

CLARENCE W. VOGT.